(12) United States Patent
Takimoto et al.

(10) Patent No.: US 7,765,046 B2
(45) Date of Patent: Jul. 27, 2010

(54) IN-VEHICLE ELECTRONIC APPARATUS AND IN-VEHICLE ELECTRONIC SYSTEM

(75) Inventors: Tatsuhiko Takimoto, Kobe (JP); Hiroshi Koutari, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 496 days.

(21) Appl. No.: 11/646,498

(22) Filed: Dec. 28, 2006

(65) Prior Publication Data
US 2008/0158019 A1  Jul. 3, 2008

(51) Int. Cl.
G06F 7/00 (2006.01)
(52) U.S. Cl. ............... 701/36; 701/1; 701/200; 340/995.1; 340/995.26; 381/86; 381/87; 381/104; 381/334
(58) Field of Classification Search ........... 701/100, 701/200, 208, 215, 1, 36; 340/995.26, 995.1; 710/303; 381/86, 87, 104, 334
See application file for complete search history.

(56) References Cited

U.S. PATENT DOCUMENTS

| | | | |
|---|---|---|---|
| 4,178,319 A | | 12/1979 | Chattha |
| 4,389,639 A | | 6/1983 | Torii et al. |
| 4,542,421 A | | 9/1985 | Fujibayashi |
| 5,493,479 A | | 2/1996 | Takahashi |
| 5,510,957 A | | 4/1996 | Takagi |
| 5,537,673 A | * | 7/1996 | Nagashima et al. ......... 455/346 |
| 5,592,389 A | * | 1/1997 | La Rue et al. ............... 701/211 |
| 5,627,547 A | * | 5/1997 | Ramaswamy et al. .. 342/357.08 |
| 5,705,975 A | | 1/1998 | Serino et al. |
| 5,733,714 A | | 3/1998 | McCulloch et al. |
| 5,774,828 A | * | 6/1998 | Brunts et al. ................ 701/210 |
| 5,794,164 A | * | 8/1998 | Beckert et al. ............. 455/3.06 |
| 5,845,282 A | | 12/1998 | Alley et al. |
| 5,862,468 A | | 1/1999 | Kim |
| 5,917,435 A | * | 6/1999 | Kamiya et al. ......... 340/995.26 |
| 5,941,933 A | * | 8/1999 | Miyake et al. .............. 701/208 |
| 5,964,821 A | * | 10/1999 | Brunts et al. ................ 701/201 |
| 5,999,126 A | * | 12/1999 | Ito .......................... 342/357.1 |

(Continued)

FOREIGN PATENT DOCUMENTS

DE   198 03 178 A1   7/1999

(Continued)

OTHER PUBLICATIONS

U.S. Appl. No. 11/645,629, filed in the U.S.P.T.O. on Dec. 27, 2006.

(Continued)

*Primary Examiner*—Khoi Tran
*Assistant Examiner*—Jaime Figueroa
(74) *Attorney, Agent, or Firm*—Oliff & Berridge, PLC

(57) ABSTRACT

An in-vehicle electronic apparatus, to which a portable navigation apparatus is attachable, and which can output audio information to multiple audio outputting portions, and the in-vehicle electronic apparatus includes a receiver receiving as audio information, first audio information being navigation audio information output by the portable navigation apparatus and second audio information through the portable navigation apparatus, and an audio selector outputting the first audio information to at least one of the multiple audio outputting portions, when the audio information is the first audio information, and outputting the second audio information to the multiple audio outputting portions, when the audio information is the second audio information.

8 Claims, 15 Drawing Sheets

U.S. PATENT DOCUMENTS

| | | | |
|---|---|---|---|
| 6,009,355 A * | 12/1999 | Obradovich et al. | 701/1 |
| 6,023,290 A * | 2/2000 | Seita | 348/118 |
| 6,055,478 A * | 4/2000 | Heron | 701/213 |
| 6,091,956 A | 7/2000 | Hollenberg | |
| 6,093,977 A * | 7/2000 | Fujita et al. | 307/10.1 |
| 6,119,060 A * | 9/2000 | Takayama et al. | 701/36 |
| 6,125,326 A | 9/2000 | Ohmura et al. | |
| 6,136,507 A | 10/2000 | Morigaki | |
| 6,148,253 A * | 11/2000 | Taguchi et al. | 701/48 |
| 6,150,925 A * | 11/2000 | Casazza | 340/425.5 |
| 6,163,079 A * | 12/2000 | Miyazaki et al. | 307/10.1 |
| 6,202,008 B1 * | 3/2001 | Beckert et al. | 701/33 |
| 6,208,932 B1 * | 3/2001 | Ohmura et al. | 701/200 |
| 6,243,645 B1 * | 6/2001 | Moteki et al. | 701/211 |
| 6,303,266 B1 | 10/2001 | Okino et al. | |
| 6,405,049 B2 | 6/2002 | Herrod et al. | |
| 6,417,786 B2 | 7/2002 | Learman et al. | |
| 6,421,606 B1 | 7/2002 | Asai et al. | |
| 6,653,049 B2 | 11/2003 | Pavelchek et al. | |
| 6,681,176 B2 | 1/2004 | Funk et al. | |
| 6,701,161 B1 | 3/2004 | Wendling | |
| 6,791,844 B2 | 9/2004 | Tobishima et al. | |
| 6,803,168 B1 | 10/2004 | Padmanaban et al. | |
| 6,816,783 B2 | 11/2004 | Hashima et al. | |
| 6,993,615 B2 | 1/2006 | Falcon | |
| 7,006,845 B2 | 2/2006 | Simon | |
| 7,016,986 B2 | 3/2006 | Fasolt | |
| 7,062,378 B2 | 6/2006 | Krull et al. | |
| 7,079,863 B2 | 7/2006 | Chikaishi | |
| 7,117,286 B2 | 10/2006 | Falcon | |
| 7,184,003 B2 | 2/2007 | Cupps et al. | |
| 7,215,950 B2 | 5/2007 | Mazzara, Jr. et al. | |
| 7,216,242 B2 | 5/2007 | Glass et al. | |
| 7,222,207 B2 | 5/2007 | Falcon | |
| 2001/0018663 A1 | 8/2001 | Dussell et al. | |
| 2002/0024597 A1 | 2/2002 | Arai et al. | |
| 2002/0068549 A1 | 6/2002 | Tendler | |
| 2002/0137541 A1 | 9/2002 | Lepley et al. | |
| 2002/0152027 A1 | 10/2002 | Allen | |
| 2003/0022624 A1 | 1/2003 | Sato | |
| 2003/0103634 A1 * | 6/2003 | Ito | 381/86 |
| 2003/0215736 A1 | 11/2003 | Oberlander et al. | |
| 2004/0058656 A1 * | 3/2004 | Chikaishi | 455/130 |
| 2004/0204159 A1 | 10/2004 | Van Bosch | |
| 2004/0247280 A1 | 12/2004 | Izawa | |
| 2005/0139731 A1 | 6/2005 | Park et al. | |
| 2006/0031617 A1 | 2/2006 | Falcon | |
| 2006/0211256 A1 | 9/2006 | Takei et al. | |
| 2008/0130206 A1 | 6/2008 | Itoh | |
| 2008/0161047 A1 * | 7/2008 | Witkowski et al. | 455/556.2 |

FOREIGN PATENT DOCUMENTS

| | | |
|---|---|---|
| EP | 0 507 990 A1 | 10/1992 |
| EP | 0 580 157 A1 | 1/1994 |
| EP | 0 658 011 A | 6/1995 |
| EP | 1 251 034 A2 | 10/2002 |
| EP | 1 727 019 A1 | 11/2006 |
| GB | 2 287 501 A | 9/1995 |
| GB | 2 336 489 A | 10/1999 |
| JP | U-57-204770 | 6/1956 |
| JP | Y-63-018184 | 5/1988 |
| JP | A 04-238218 | 8/1992 |
| JP | A 07-074479 | 3/1995 |
| JP | A-07-132779 | 5/1995 |
| JP | A-07-156719 | 6/1995 |
| JP | A 08-007977 | 1/1996 |
| JP | A 08-260794 | 10/1996 |
| JP | 08-318792 | 12/1996 |
| JP | A 08-318792 | 12/1996 |
| JP | A 10-16654 | 1/1998 |
| JP | A 10-103999 | 4/1998 |
| JP | A 10-135669 | 5/1998 |
| JP | A 10-199220 | 7/1998 |
| JP | A 11-289173 | 10/1999 |
| JP | 2000-311029 A | 11/2000 |
| JP | A 2001-015936 | 1/2001 |
| JP | A-2001-052473 | 2/2001 |
| JP | 2001-141471 A | 5/2001 |
| JP | A 2001-239895 | 9/2001 |
| JP | KR-A-10-2001-0112146 | 12/2001 |
| JP | A-2002-74922 | 3/2002 |
| JP | A-2002-181555 | 6/2002 |
| JP | A-2002-267461 | 9/2002 |
| JP | A 2002-328026 | 11/2002 |
| JP | A 2003-003554 | 1/2003 |
| JP | 2003-035554 A | 2/2003 |
| JP | 2003-037514 A | 2/2003 |
| JP | A 2003-166848 | 6/2003 |
| JP | A 2003-521825 | 7/2003 |
| JP | A-2003-308686 | 10/2003 |
| JP | 2003-315065 A | 11/2003 |
| JP | A 2004-234794 | 8/2004 |
| JP | 2005-173653 A | 6/2005 |
| JP | A 2005-524570 | 8/2005 |
| KR | 10-2003-0071743 A | 9/2003 |
| KR | 10-2004-0061642 A | 7/2004 |
| KR | 20-0372059 Y1 | 1/2005 |
| KR | 10-2005-0017296 A | 2/2005 |
| KR | 10-2005-0072425 A | 7/2005 |
| KR | 10-2006-0030344 A | 4/2006 |
| KR | 2006-128470 A | 12/2006 |
| WO | WO 98/39852 | 9/1998 |
| WO | WO 99/38728 | 8/1999 |
| WO | WO-2004/092840 A1 | 10/2004 |
| WO | WO 2006/130784 A2 | 12/2006 |

OTHER PUBLICATIONS

U.S. Appl. No. 11/645,642, filed in the U.S.P.T.O. on Dec. 27, 2006.
U.S. Appl. No. 11/645,628, filed in the U.S.P.T.O. on Dec. 27, 2006.
U.S. Appl. No. 11/646,539, filed in the U.S.P.T.O. on Dec. 28, 2006.
U.S. Appl. No. 11/646,477, filed in the U.S.P.T.O. on Dec. 28, 2006.
U.S. Appl. No. 11/646,566, filed in the U.S.P.T.O. on Dec. 28, 2006.
U.S. Appl. No. 11/645,672, filed in the U.S.P.T.O. on Dec. 27, 2006.
U.S. Appl. No. 11/646,557, filed in the U.S.P.T.O. on Dec. 28, 2006.
U.S. Appl. No. 11/646,478, filed in the U.S.P.T.O. on Dec. 28, 2006.
U.S. Appl. No. 11/646,558, filed in the U.S.P.T.O. on Dec. 28, 2006.
U.S. Appl. No. 11/646,538, filed in the U.S.P.T.O. on Dec. 28, 2006.
U.S. Appl. No. 11/646,479, filed in the U.S.P.T.O. on Dec. 28, 2006.
M. Mukasa. "Detachable-Panel Connectors Respond to Needs for Anti-Theft Designs," JEE Journal of Electronic Engineering Feb. 30, 1993, No. 314, Tokyo, Japan.
European Search Report, Oct. 1, 2009; European Patent Office.

* cited by examiner

IN-VEHICLE ELECTRONIC APPARATUS AND IN-VEHICLE ELECTRONIC SYSTEM

BACKGROUND OF THE INVENTION

1. Field of the Invention

This invention relates to in-vehicle electronic apparatuses and in-vehicle electronic systems, more particular, to an electronic apparatus to which a portable navigation apparatus is attached and an electronic system therefor.

2. Description of the Related Art

As conventional navigation apparatuses, there are widely known small-sized portable navigation apparatuses with simplified structure and portability (hereinafter, referred to as Portable Navi), also known as Personal Navigation Device; and in-vehicle navigation apparatuses accommodated and fixed in a recess portion (DIN opening) formed in a dashboard of a vehicle. The in-vehicle navigation apparatuses are capable of guiding with high accuracy by use of the information supplied from vehicles such as vehicle speed, and some of the in-vehicle navigation apparatuses are equipped with audio devices.

In recent years, the navigation apparatuses with portability of the Portable Navi and high-accuracy guide function of the in-vehicle navigation apparatus have been studied.

Japanese Patent Application Publication No. 8-318792, Japanese Patent Application Publication No. 2002-328026, Japanese Patent Application Publication No. 2005-524570, and Japanese Patent Application Publication No. 2001-239895 disclose a configuration where a navigation portion can be detached from an in-vehicle apparatus mounted in a vehicle. By removing the navigation portion from the in-vehicle apparatus, the navigation portion can be used as a Portable Navi of a single unit. Also, as disclosed in Japanese Patent Application Publication No. 2003-166848, the navigation apparatus is taken out of the vehicle and can be used while walking. In addition, when mounted in a vehicle, the navigation apparatus is in a car-navigation mode, and when taken out of the vehicle, the navigation apparatus is in a person-navigation mode.

In some cases, from a detachable portable navigation apparatus to an in-vehicle electronic apparatus, the navigation audio information and music data or the like is output.

In the afore-mentioned case, audio information for navigation and that for music data or the like are sent by different connecting lines (cables or the like) from the portable navigation apparatus to the in-vehicle electronic apparatus. In this manner, since two types of audio information are sent to the in-vehicle electronic apparatus from the portable navigation apparatus, two connecting lines and two connectors are needed, impeding the reduction in size and cost. In addition, since it is enough for some of passengers to hear the navigation guidance, it may be annoying for other passengers.

SUMMARY OF THE INVENTION

The present invention has been made in view of the above circumstances and provides an in-vehicle electronic apparatus and an in-vehicle electronic system, in which the size and cost thereof can be reduced and annoyance for a passenger can be attenuated.

According to one aspect of the present invention, there is provided an in-vehicle electronic apparatus, to which a portable navigation apparatus is attachable, and which can output audio information to multiple audio outputting portions, the in-vehicle electronic apparatus including: a receiver receiving as audio information, first audio information being navigation audio information output by the portable navigation apparatus and second audio information through the portable navigation apparatus; and an audio selector outputting the first audio information to at least one of the multiple audio outputting portions, when the audio information is the first audio information, and outputting the second audio information to the multiple audio outputting portions, when the audio information is the second audio information. Since the first audio information and the second audio information are received by one connecting line, thereby necessitating only one connecting line and one connectors and enabling the reduction In size and cost. In addition, the navigation audio is output from one of the sound outputting portions, and the second audio information can be output from one of the outputting portions. This can mitigate the discomfort of the passenger due to the navigation audio.

According to another aspect of the present invention, there is provided an in-vehicle electronic system provided with a portable navigation apparatus and an in-vehicle electronic apparatus, to which the portable navigation apparatus is attachable, and which can output audio information to multiple audio outputting portions, the in-vehicle electronic system including: a receiver provided in the in-vehicle electronic apparatus and receiving as audio information, first audio information being navigation audio information output by the portable navigation apparatus and second audio information through the portable navigation apparatus; and an audio selector provided in the in-vehicle electronic apparatus and outputting the first audio information to at least one of the multiple audio outputting portions, when the audio information is the first audio information, and outputting the second audio information to the multiple audio outputting portions, when the audio information is the second audio information. This enables the reduction in size and cost and enables the passenger's discomfort to be mitigated.

BRIEF DESCRIPTION OF THE DRAWINGS

Exemplary embodiments of the present invention will be described in detail with reference to the following drawings, wherein.

DESCRIPTION OF THE PREFERRED EMBODIMENTS

A description will now be given, with reference to the accompanying drawings, of exemplary embodiments of the present invention.

First Exemplary Embodiment

Figure 1A:
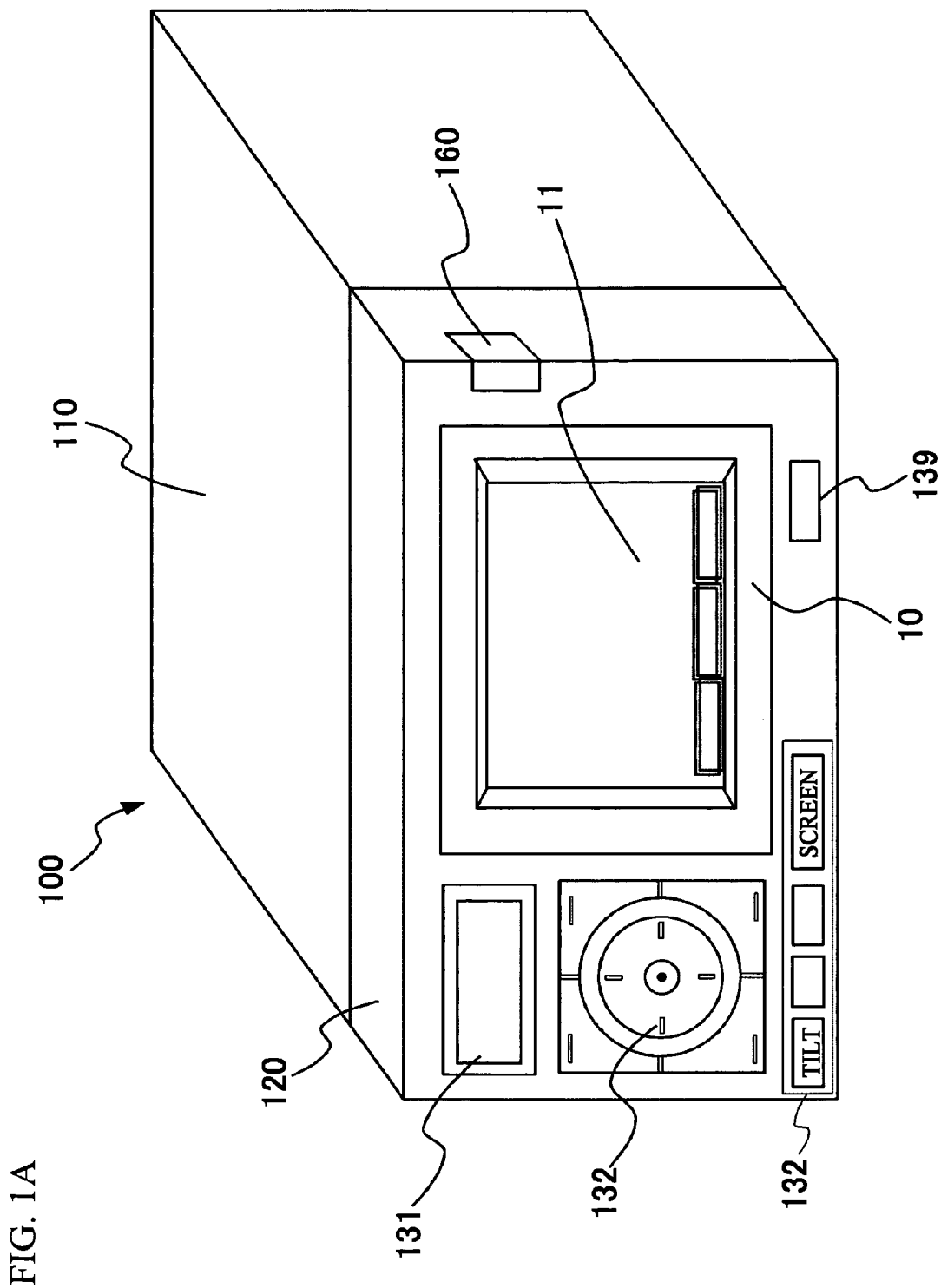
FIG. 1A and FIG. 1B show exterior views of an in-vehicle system employed in an exemplary embodiment of the present invention.
Figure 1B:
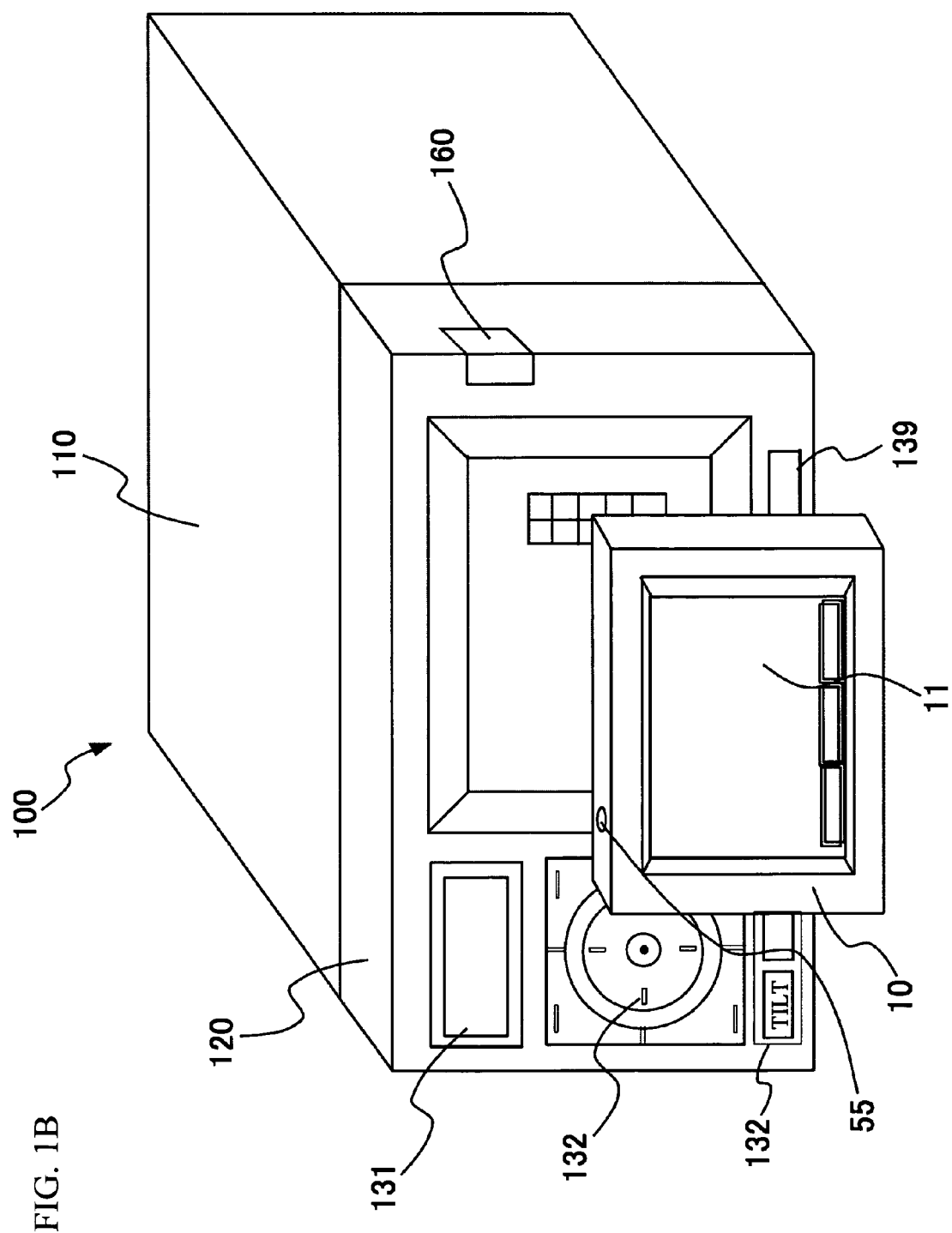

FIG. 1A and FIG. 1B show exterior views of an in-vehicle system 1, as an example of an electronic system. As shown in FIG. 1A and FIG. 1B, the in-vehicle system 1 is composed of: an in-vehicle apparatus 100 (in-vehicle electronic apparatus); and a portable apparatus 10 (portable navigation apparatus) with navigation capabilities. The portable apparatus 10 can be used after being attached at a front face portion 120 of the in-vehicle apparatus 100, as shown in FIG. 1A, and can be also used after being detached from the in-vehicle apparatus 100, as shown in FIG. 1B. In this manner, the portable apparatus 10 is detachable from the in-vehicle apparatus 100, and the portable apparatus 10 is attachable to the in-vehicle apparatus 100.

The in-vehicle apparatus 100 is capable of playing radio broadcasting or playing music data recorded on a memory medium such as a CD (Compact Disc) or the like, and the in-vehicle apparatus 100 includes: an in-vehicle apparatus main body 110 having a CD player and a CD insertion/ejection slot; and the front face portion 120 having a display portion 131 and an operating portion (main operating portion) 132.

The portable apparatus 10 has navigation capabilities of searching for a guiding path to a destination and displaying the searched guiding path over a map.

Figure 2:
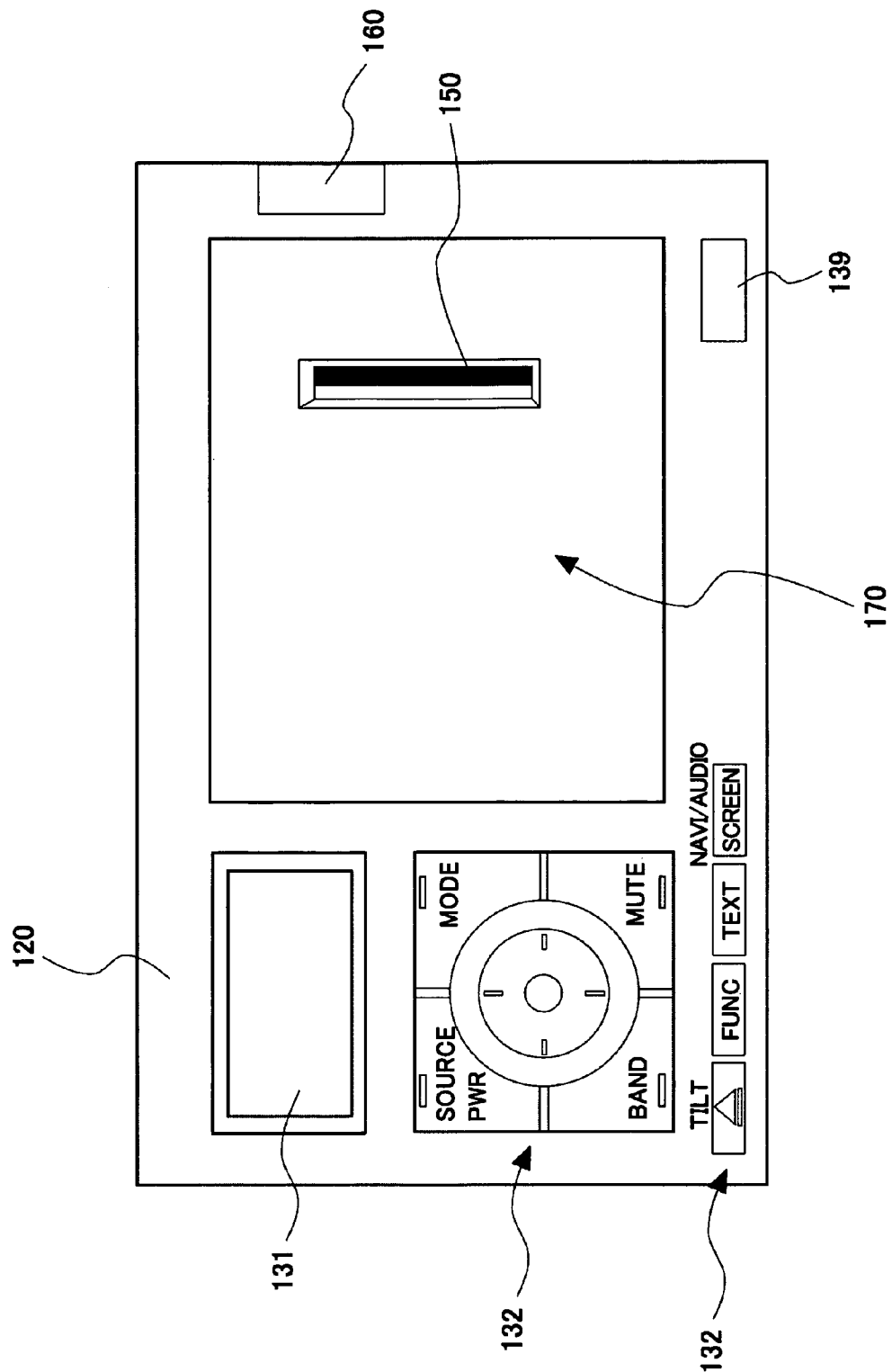
FIG. 2 shows a front face portion of the in-vehicle apparatus, from which the portable apparatus is removed.

FIG. 2 shows the front face portion 120 of the in-vehicle apparatus 100, from which the portable apparatus 10 is removed. There is provided an attached/detached portion 170 in which a recess portion is defined for attaching the portable apparatus 10, at the front face portion 120 of the in-vehicle apparatus 100. The attached/detached portion 170 is provided with: a connector 150 (housing portion side connector) for electrically coupling the in-vehicle apparatus 100 and the portable apparatus 10; and a lock mechanism (not shown) for securing the portable apparatus 10 to the front face portion 120. When a detach button 160 provided at the front face portion 120 is operated, a lock mechanism, not shown, is unlocked and the portable apparatus 10 is detachable from the in-vehicle apparatus 100.

Figure 3:
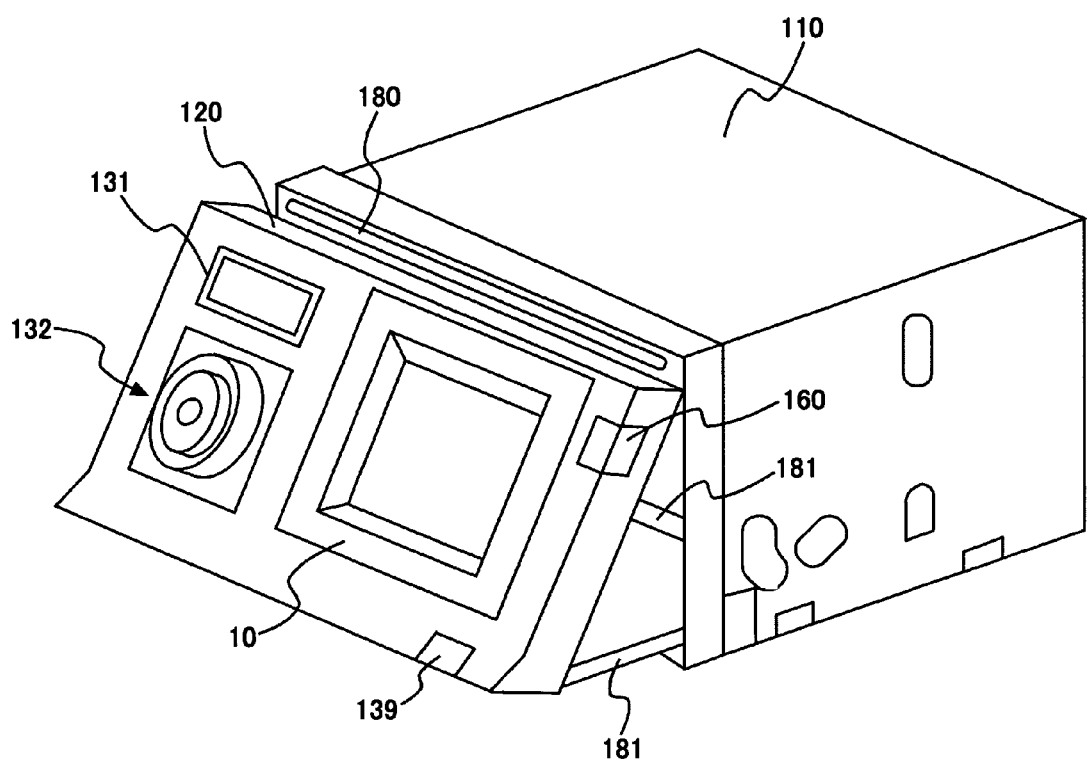
FIG. 3 is a view showing a state of tilting the front face portion against the main body of the in-vehicle apparatus to expose a CD insertion/ejection slot.

FIG. 3 shows a state of tilting the front face portion 120 against the in-vehicle apparatus main body 110 to expose a CD insertion/ejection slot 180.

By driving a slider 181 shown in FIG. 3 with a drive mechanism, not shown, the front face portion 120 can be tilted against the in-vehicle apparatus main body 110. By tilting operation, the CD insertion/ejection slot 180 provided in the in-vehicle apparatus main body 110 is exposed, so a CD can be inserted or ejected. There is provided an operation button (a tilt/eject button 132a shown in FIG. 6), at the front face portion 120 of the in-vehicle apparatus 100, and a tilt angle can be set according to the operation of the button.

Figure 4:
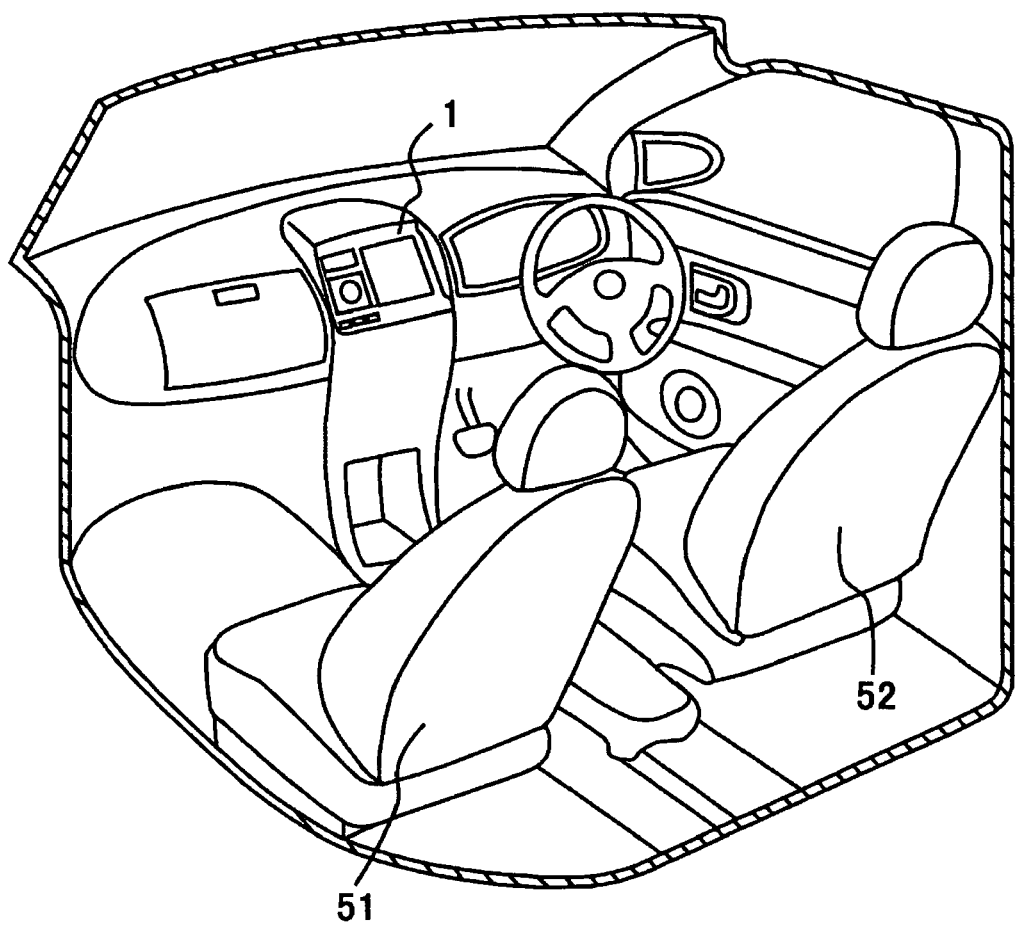
FIG. 4 shows a state of mounting the in-vehicle system in a vehicle.

FIG. 4 illustrates an example of mounting the in-vehicle system 1 in a vehicle.

The in-vehicle system 1 is disposed in a dashboard portion substantially in the middle of a front-passenger's seat 51 and a driver's seat 52, as shown in FIG. 4, for example.

Here, a GPS (Global Positioning System) antenna, not shown, of a GPS information receiver 133 is located on the dashboard or attached at an inner side of a front glass.

Figure 5:
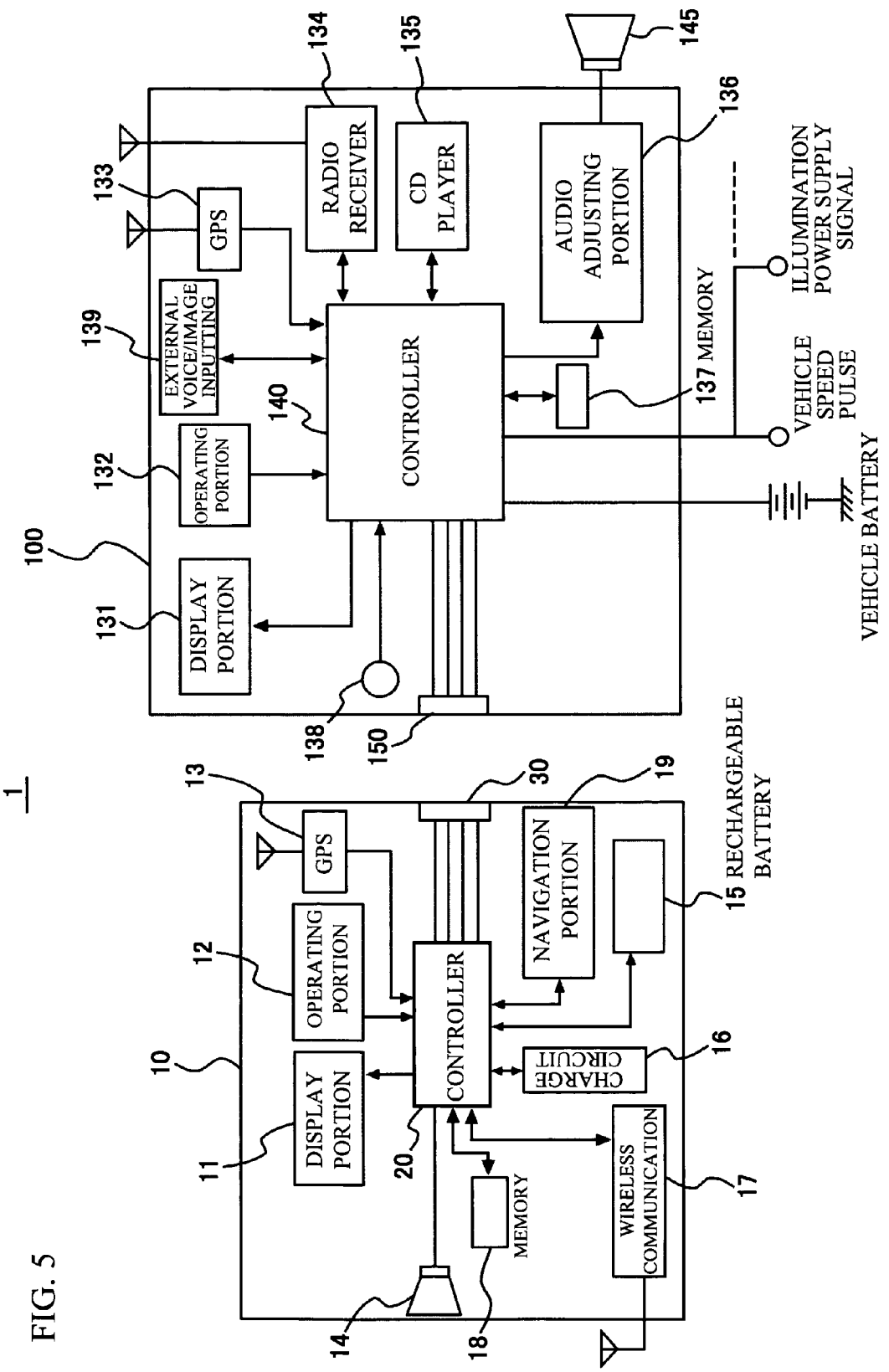
FIG. 5 is a block diagram showing a schematic configuration of the in-vehicle system.

FIG. 5 is a block diagram showing a schematic configuration of the in-vehicle system 1.

The in-vehicle apparatus 100 and the portable apparatus 10 are electrically connected by connectors. The connector 150 is provided at the in-vehicle apparatus 100 side, and a connector 30 (portable apparatus side connector) is provided at the portable apparatus 10. By connecting the connectors 150 and 30, various signals are sent and received between the in-vehicle apparatus 100 and the portable apparatus 10 to function as the in-vehicle system 1. The connectors 150 and 30 are respectively provided with power supply terminals for supplying power to the portable apparatus 10 from the battery of the vehicle. When the portable apparatus 10 is connected to the in-vehicle apparatus 100 and the power is supplied to the in-vehicle apparatus 100, the power is also supplied to the portable apparatus 10 via the power supply terminals.

The in-vehicle apparatus 100 is provided with: the display portion 131; the operating portion 132; the GPS information receiver 133; a radio receiver 134; a CD player 135; an audio adjusting portion 136; a memory 137; a microphone 138; an external voice/image inputting portion 139; a controller 140; and the connector 150. The in-vehicle apparatus 100 is activated by supplying the power from the battery of the vehicle, when the engine key is positioned at Acc or IG.

Hereinafter, the function of each part will be described in detail.

The display portion 131 is provided with a liquid crystal panel and a backlight, and displays a frequency of the received broadcasting, a track number of music being played, a music name being played, and the like, according to the 13-segment display.

Figure 6:
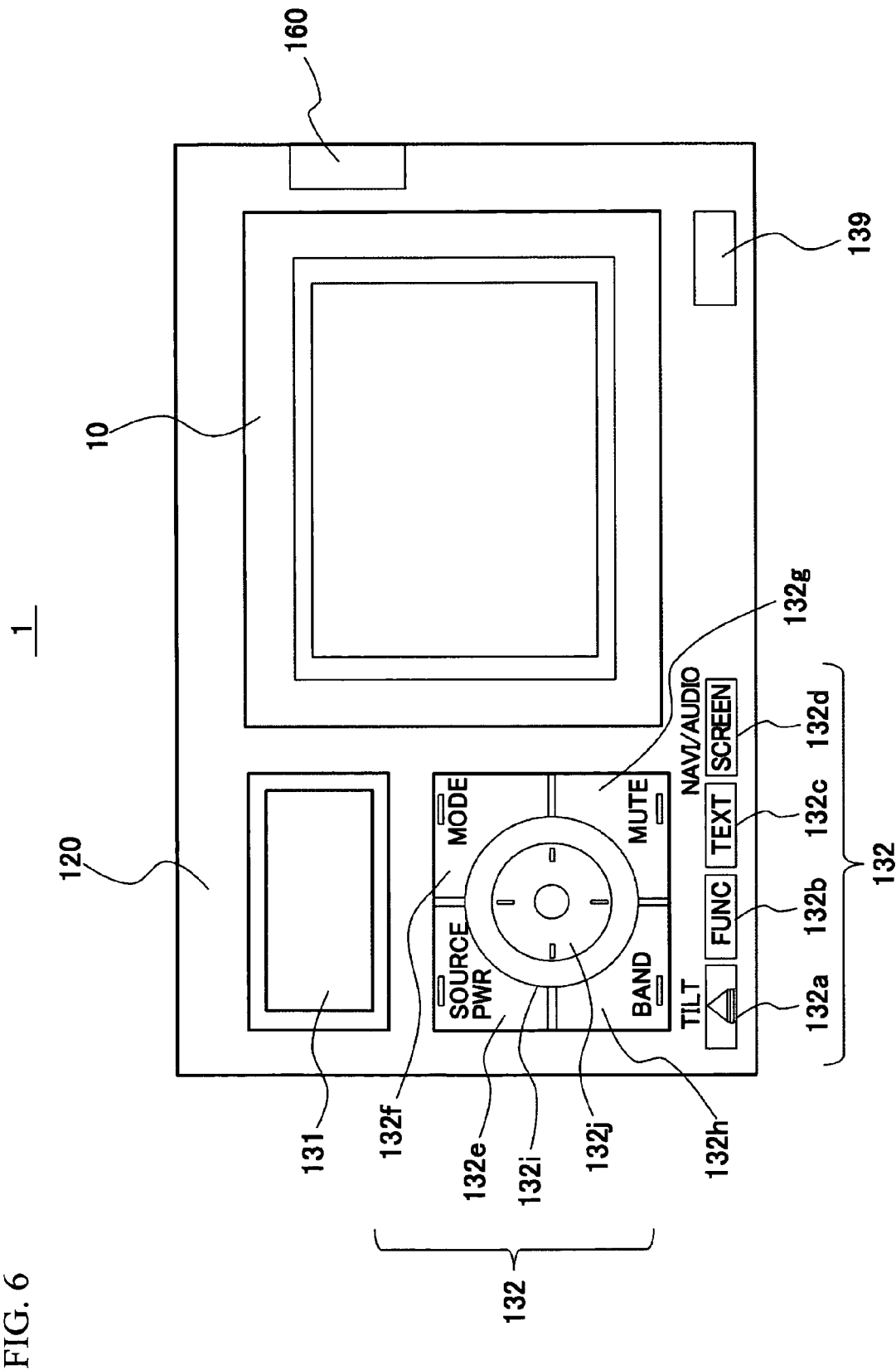
FIG. 6 is a front view of a main body.

The operating portion 132 is provided for selectively changing the operation mode of the in-vehicle apparatus 100, and for operating in various modes that have been changed. The operating portion 132 is provided with a group of buttons including: the tilt/eject button 132a; a function (represented as FUNC in the drawing)/AF button 132b; a TEXT button 132c; a SCREEN button 132d; a SOURCE/PWR button 132e; a MODE button 132f; a MUTE button 132g; a BAND change button 132h; a rotary button 132i; a cross key/enter key button 132j, as shown in FIG. 6.

Here, a description will be given of switching the display between the portable apparatus 10 and the in-vehicle apparatus 100.

Firstly, the in-vehicle apparatus 100 turns on when the SOURCE/POWER button 132e of the in-vehicle apparatus 100 is pushed. When the SOURCE/POWER button 132e is pushed for a short period of time while the portable apparatus 10 is on, the source is changed to the CD playing or radio broadcasting. At this time, the information on the selected source is displayed on the display portion 131 of the in-vehicle apparatus 100, and the navigation image is displayed on a display portion 11 of the portable apparatus 10, without relation to the source.

Next, when the SCREEN button 132d is pushed, the navigation image displayed on the display portion 11 of the portable apparatus 10 can be changed to an image corresponding to the source selected at the in-vehicle apparatus 100.

Figure 7A:
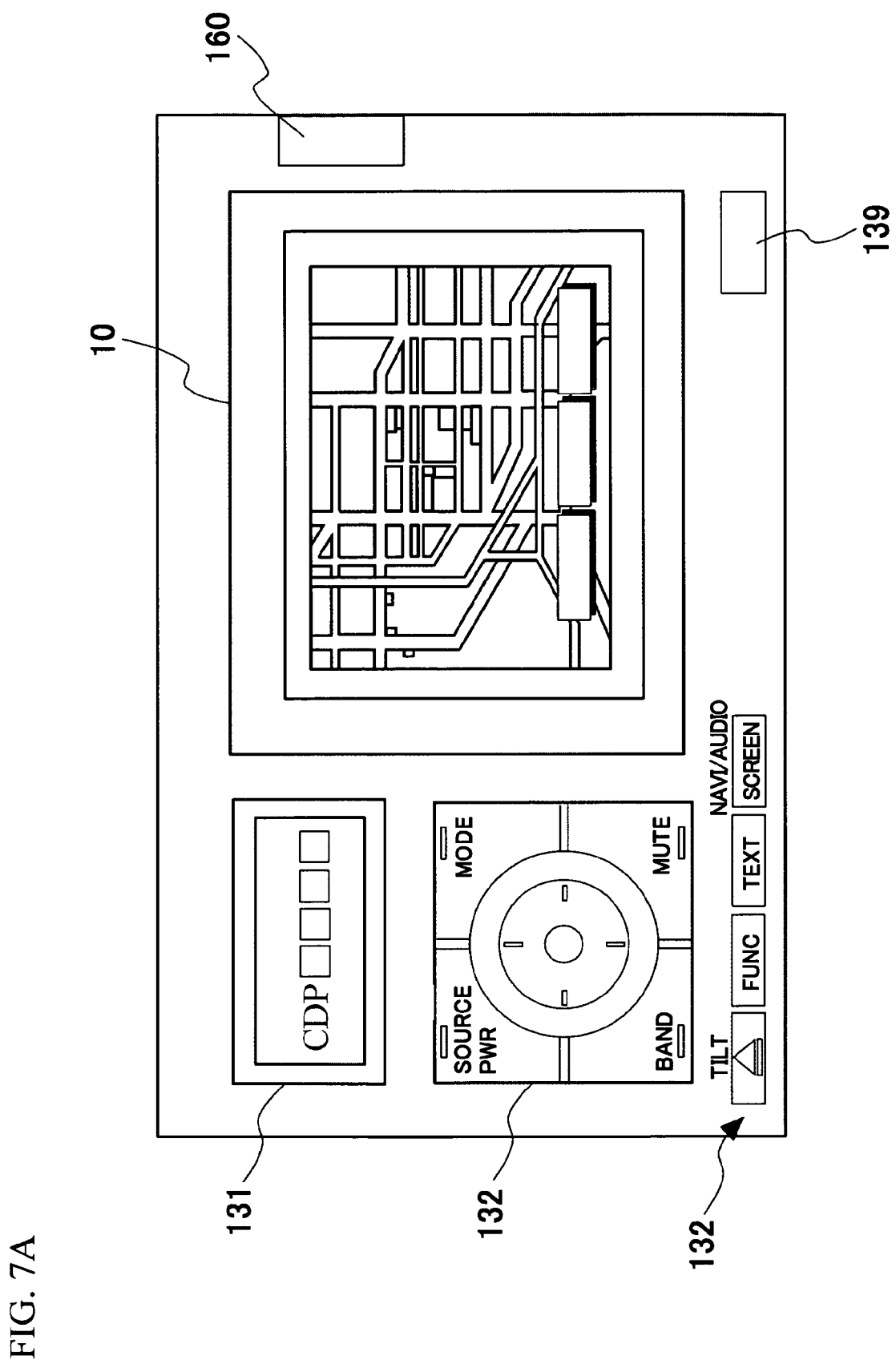
FIG. 7A through FIG. 7C show display examples of the portable apparatus attached to the main body.

FIG. 7A shows a state where the portable apparatus 10 is attached to the in-vehicle apparatus 100 while the CD is being played and a navigation image is being displayed on the portable apparatus 10.

Figure 7B:
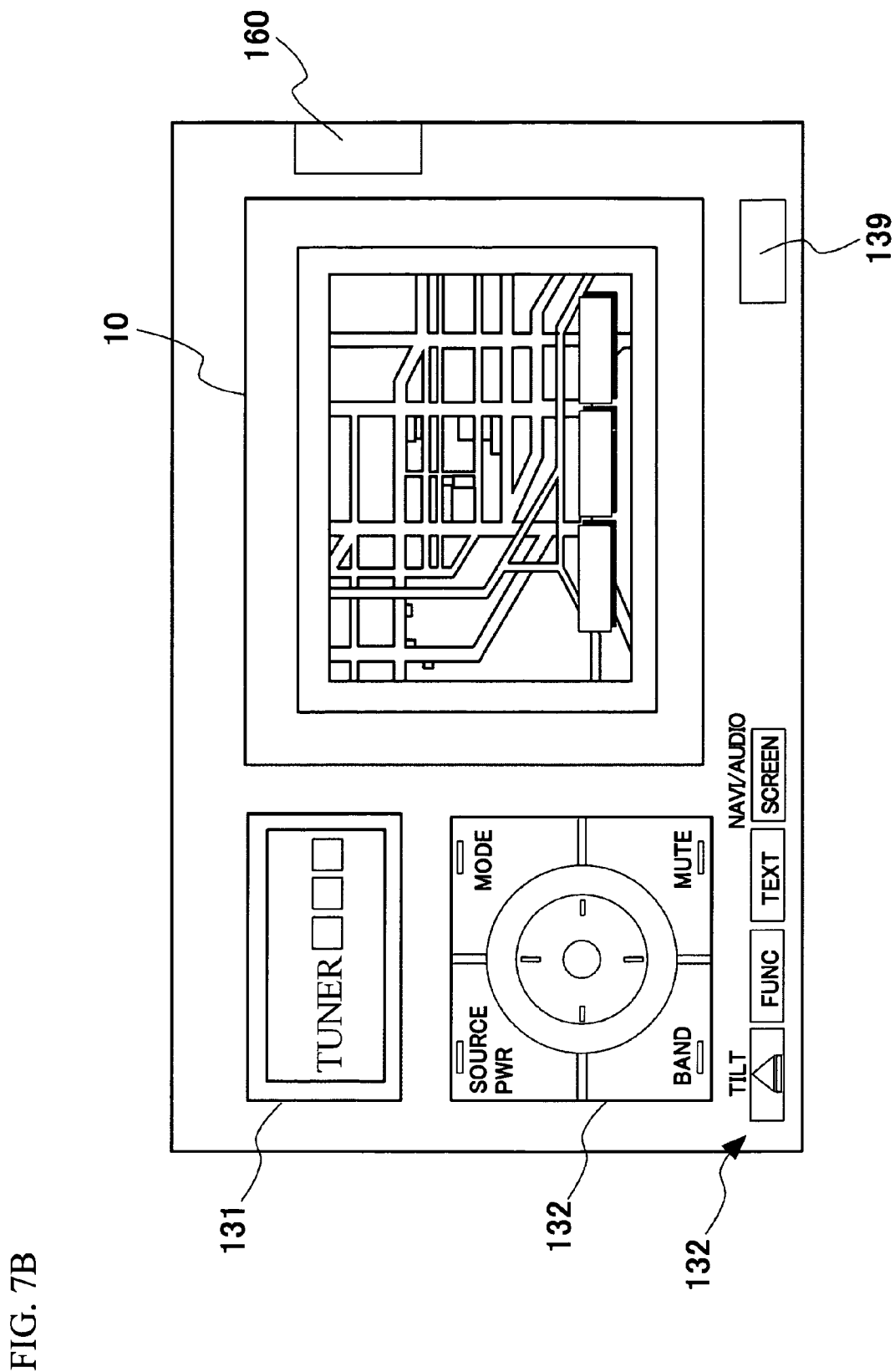

When the SOURCE/POWER button 132e is pushed in the state of FIG. 7A and the source is changed from the CD playing to the radio broadcasting, the information on the radio source is displayed on the display portion 131, as shown in FIG. 7B. Also, the navigation image remains being displayed on the display portion 11 of the portable apparatus 10.

Figure 7C:
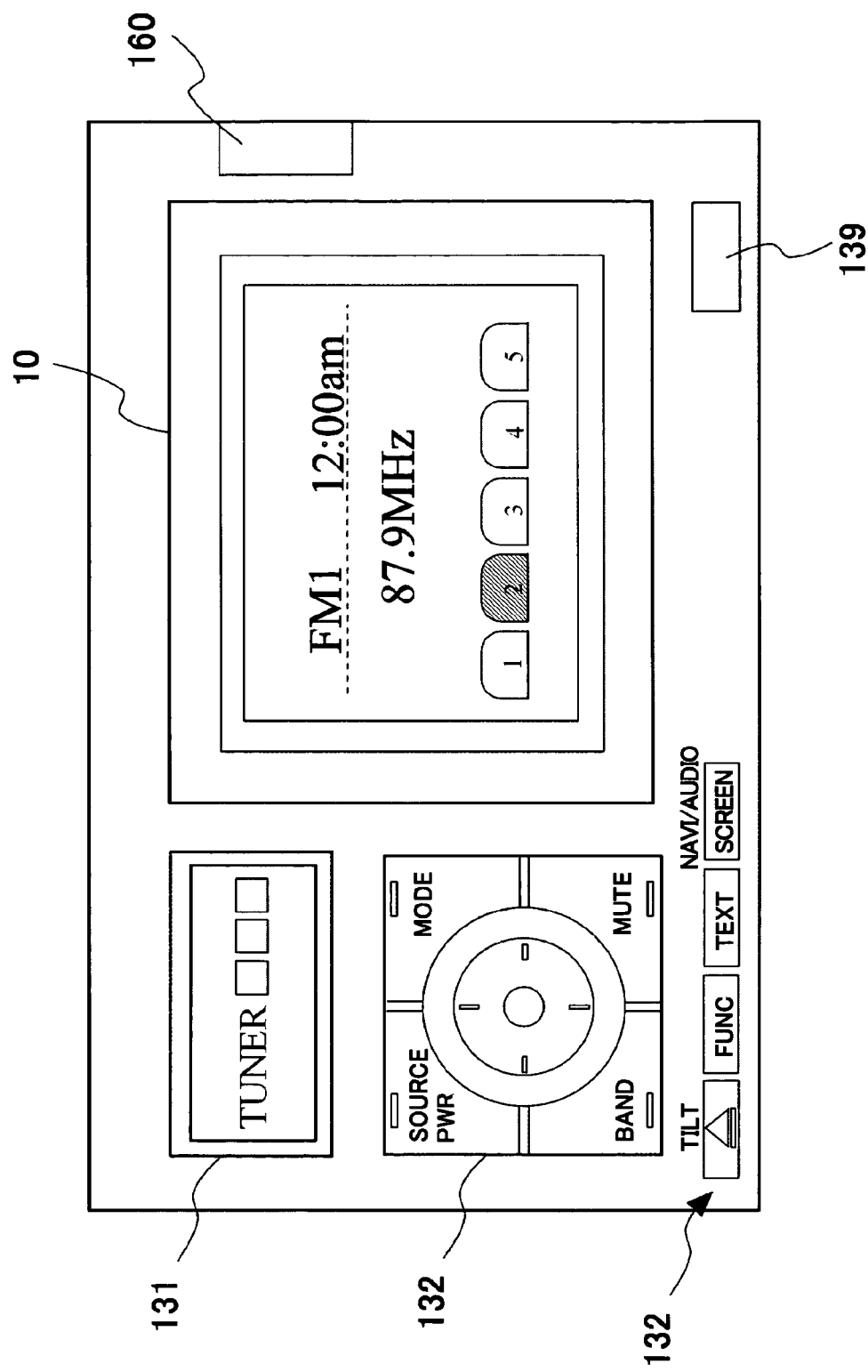

Then, when a user pushes the SCREEN button 132*d*, the image corresponding to the source being processed by the in-vehicle apparatus 100 is displayed on the display portion 11 of the portable apparatus 10, as shown in FIG. 7C (radio image is displayed in FIG. 7C). A touch panel, described later, is provided in the display portion 11 of the portable apparatus 10. A user is capable of operating the source currently being processed, by selecting the operation buttons displayed on the display portion 11.

In addition, when the SCREEN button 132*d* is pushed with the radio screen being displayed on the display portion 11, it is possible to return to the navigation image from the radio image, as shown in FIG. 7B. When the portable apparatus 10 is removed from the in-vehicle apparatus 100, the operation of the SCREEN button 132*d* is invalid.

Furthermore, when a USB (Universal Serial Bus) or the like is connected to the external voice/image inputting portion 139 with the portable apparatus 10 removed from the in-vehicle apparatus 100, it is possible to prevent the change to the USB source, even if the SOURCE/POWER button 132*e* is pushed.

Referring back to FIG. 5, the GPS information receiver 133 includes a GPS antenna and a tuner, and receives GPS signals from a satellite. The GPS signal received by the GPS information receiver 133 is output through the controller 140, the connector 150, the connector 30, and a controller 20, to a navigation portion 19 of the portable apparatus 10, and then the position of the vehicle in which the in-vehicle apparatus 100 having the portable apparatus 10 therein is determined based on the GPS signal.

Herein, the GPS signal may be output to the navigation portion of the portable apparatus 10 through the controller 140, instead of through the controller 20. Alternatively, the GPS information receiver 133 may be composed of the GPS antenna only, so that the GPS signal received by the GPS antenna may be output to the tuner of a GPS information receiver 13, described later, without through the controller 140 or the controller 20. Further alternatively, the GPS signal received by a GPS antenna may be output through the controller 20 to the tuner of the GPS information receiver 13 without through the controller 140. Various changes may be made as necessary.

The radio receiver 134 has an antenna and a tuner, receives broadcast waves such as AM broadcasting, FM broadcasting, and sound multiplex broadcasting, outputs stereo audio signals, receives and demodulates multiplex data, and outputs the demodulated signal to the controller 140.

The CD player 135 reproduces the data stored in the CD, and outputs the reproduced signal to the controller 140.

Herein, the demodulated signal output from the radio receiver 134 may be output to the audio adjusting portion 136, described later, without through the controller 140.

The audio adjusting portion 136 implements signal processing such as volume control or tone control on an audio signal received or demodulated by the radio receiver 134 or the audio signal reproduced by the CD player 135, and then outputs the processed signal to a speaker 145.

The memory 137 may be composed of a RAM (Random Access Memory) from which data is readable and into which data is writable, and temporarily stores information necessary for control.

The microphone 138 is provided for hands-free communication, and takes in user's voices in the vehicle.

The external voice/image inputting portion 139 is provided with a connection terminal with an external device such as a USB memory, portable audio device, or the like so that an audio signal or data from the external device may be input. The external voice/image inputting portion 139 then sends the signal or data to the controller 140, and outputs the audio signal, data, or the like to the external device connected.

The controller 140 controls the radio receiver 134, the CD player 135, and the audio adjusting portion 136, according to the operation by means of the operating portion 132.

Also, the controller 140 outputs various signals through the connector 150 to the portable apparatus 10, and controls the in-vehicle apparatus 100 on the basis of the various signals input from the portable apparatus 10. For example, the controller 140 outputs the GPS signal received by the GPS information receiver 133 or the audio signal input through the microphone 138, to the portable apparatus 10 by way of the connector 150.

Here, the audio signal input through the microphone 138 may be output to the portable apparatus 10 by way of the connector 150, without through the controller 140.

In addition, the voice on communication over a mobile phone connected to the portable apparatus 10 is input through the connector 150 into the controller 140, and is then output through the audio adjusting portion 136 to the speaker 145.

Furthermore, the controller 140 acquires an operation signal corresponding to a menu image of various modes displayed on the display portion 11 of the portable apparatus 10, from the controller 20 of the portable apparatus 10, and then controls the radio receiver 134 and the CD player 135.

Also, the power is supplied to the controller 140 from the battery mounted in the vehicle. When the portable apparatus 10 is connected, the controller 140 outputs the power supplied from the battery to the portable apparatus 10.

Here, a vehicle speed pulse and an illumination power supply signal are input into the controller 140 from a vehicle. The controller 140 transfers such input vehicle speed pulse to the controller 20 of the portable apparatus 10. Meanwhile, the vehicle speed pulse may be configured not to be input into the in-vehicle apparatus 100.

Next, a description will be given of the portable apparatus 10. The portable apparatus 10 is provided with: the display portion 11; an operating portion 12; the GPS information receiver 13; a speaker 14; a rechargeable battery 15; a charge circuit 16; a wireless communication transmitter/receiver 17; a memory 18; the navigation portion 19; the controller 20; and the connector 30.

Hereinafter, functions of the components will be described in detail.

The display portion 11 is provided with a liquid crystal panel and a backlight, and is capable of displaying map information generated by the navigation portion 19 and guiding path information to a destination, the received broadcasting frequency transferred from the in-vehicle apparatus 100, a music track number played, music name played, and the like.

Here, the display portions 11 and 131 may employ a flat panel display other than a liquid crystal panel. Examples are organic light emitting display, plasma display panel, cold-cathode flat panel display, or the like.

The operating portion 12 includes a power button 55 (see FIG. 8A) for powering on or off the touch panel or the portable apparatus 10. The touch panel is, for example, disposed on the display screen. When the touch panel is touched by a finger or a dedicated pen, the touched position is detected to determine whether or not there is an input operation. The power button 55 will be described later in detail.

The GPS information receiver 13 includes an antenna and a tuner, and receives the GPS signal from a satellite. Such received GPS signal is output to the navigation portion 19, and the vehicle location is detected based on the GPS signal. Meanwhile, the in-vehicle apparatus 100 is also provided with the GPS information receiver 133. However, when the portable apparatus 10 is attached to the in-vehicle apparatus 100, the location of the vehicle, in which the in-vehicle apparatus 100 having the portable apparatus 10 is mounted, is specified by use of the GPS signal (and the vehicle speed pulse) received by the GPS information receiver 133. When the portable apparatus 10 is used alone, the location thereof is specified by use of the GPS signal received by the GPS information receiver 13.

The speaker 14 is provided for outputting the audio information of the navigation portion 19, and outputs the audio information only when the portable apparatus 10 is detached from the in-vehicle apparatus 100, namely, used alone separately.

The rechargeable battery 15 supplies power to each portion of the portable apparatus 10, when the portable apparatus 10 is detached from the in-vehicle apparatus 100. When the portable apparatus 10 is attached to the in-vehicle apparatus 100, the power is supplied through the power supply terminals of the connector 30 from the battery of the vehicle and the rechargeable battery 15 is charged by the charge circuit 16. Also, the charge circuit 16 is supplied with the power from the connection terminal through a USB slot 57 (see FIG. 8A), and the rechargeable battery 15 can be charged.

The wireless communication transmitter/receiver 17 sends and receives the voice on communication over a mobile phone, and acquires the information used for navigation over the mobile phone. For example, Bluetooth, which is a wireless transmission system at 2.4 GHz band, is used for the wireless communication transmitter/receiver 17.

The memory 18 may be a RAM from which data is readable and into which the data is writable, and temporarily stores the information read for each control.

The navigation portion 19 includes a map information storing portion that acquires from an SD (Secure Digital) card or a USB memory, described later, and stores the map information used for navigation, determines current location information with GPS signal from the GPS information receiver 133 or the GPS information receiver 13, and creates a map image for navigation. The created map image can be displayed on the display portion 11. In addition, when the in-vehicle apparatus 100 and the portable apparatus 10 are connected, the vehicle speed pulse is acquired from the vehicle so that the accuracy of the location detection of the vehicle can be improved. Optionally, the map information may be retained in the portable apparatus 10.

The controller 20 controls each part of the portable apparatus 10. Also, the controller 20 outputs various signals to the in-vehicle apparatus 100 through the connector 30, and controls the portable apparatus 10 based on the various signals input from the in-vehicle apparatus 100. For example, the controller 20 acquires the GPS signal received by the GPS information receiver 133 of the in-vehicle apparatus 100 and the vehicle speed pulse, and outputs to the navigation portion 19. Also, the controller 20 acquires the audio signal input by the microphone 138 of the in-vehicle apparatus 100 from the controller 140 of the in-vehicle apparatus 100, and controls the navigation portion 19 according to the audio signal acquired. That is to say, the navigation portion 19 can be operated in a hands-free manner. The voice on communication over the mobile phone connected to the wireless communication transmitter/receiver 17 is output to an in-vehicle apparatus side through the connector 30, and is caused to output from the speaker 145 of the in-vehicle apparatus 100. The operation signal on the menu screen or content screen displayed on the display portion 11 is output to the controller 140 of the in-vehicle apparatus 100 through the connector 30. The controller 140 controls the radio receiver 134 or the CD player 135 according to the operation signal transmitted from the controller 20 of the portable apparatus 10.

Figure 8A:
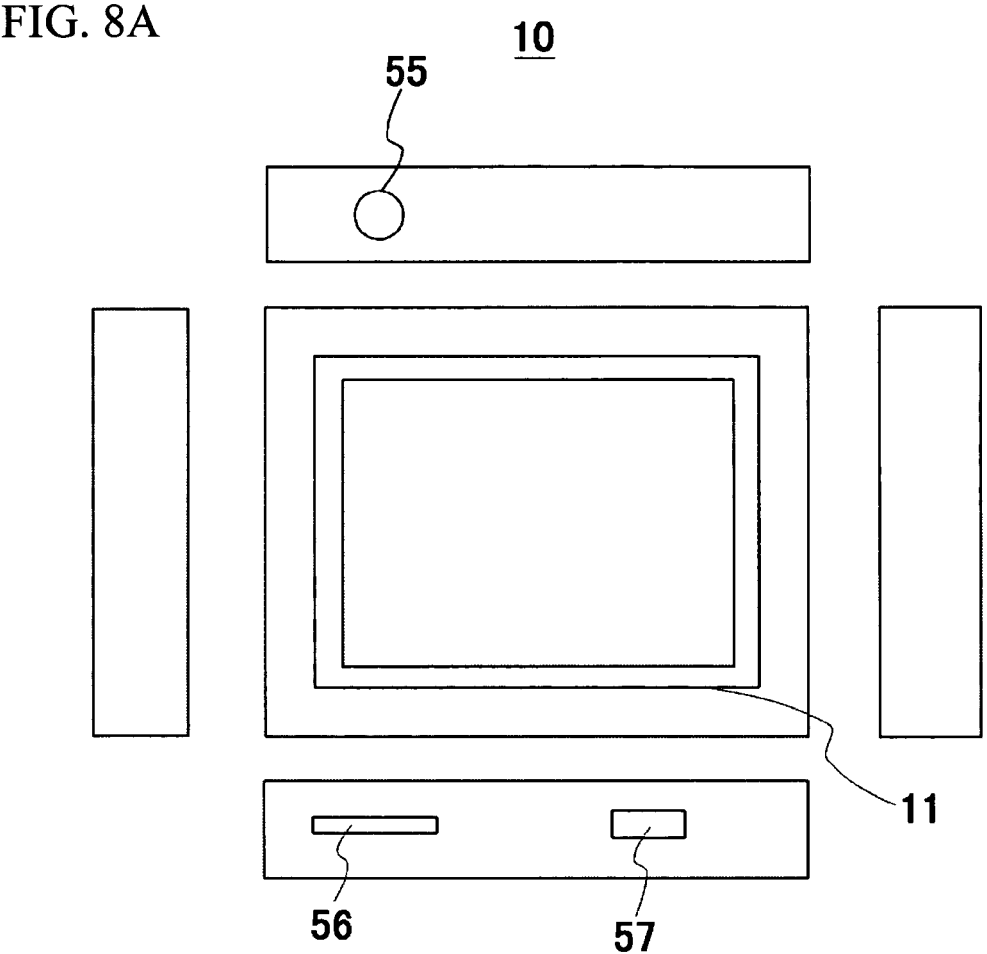
FIG. 8A shows a front view, top view, bottom view, left-side view, and right-side view of the portable apparatus.
Figure 8B:
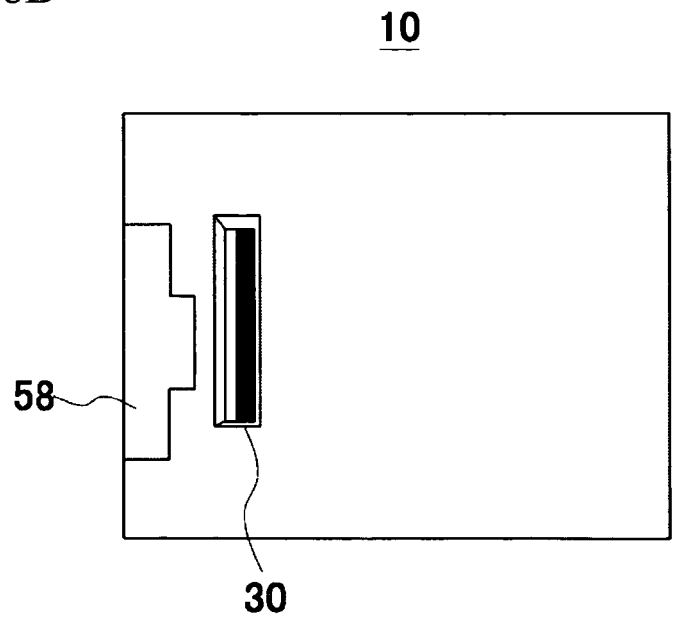
FIG. 8B is a back view of the portable apparatus.

FIG. 8A shows a front view, top view, bottom view, left-side view, and right-side view of the portable apparatus 10. FIG. 8B is a back view of the portable apparatus 10.

The top face of the portable apparatus 10 is provided with the power button 55 for turning on or off the power of the portable apparatus. The bottom face of the portable apparatus 10 is provided with: an SD memory card slot 56; and the USB slot 57. By inserting the SD card or the USB memory storing the map information into the slots, the controller 20 reads the map information from the SD card or the USB memory and outputs the map information to the navigation portion 19.

The power of the portable apparatus 10 is turned on or off by the control of the in-vehicle apparatus 100, when the portable apparatus is attached to the in-vehicle apparatus 100. In addition, when the portable apparatus 10 is removed from the in-vehicle apparatus 100 and used alone, the power is operated on the basis of the on and off operations of the power button 55.

At a backside of the portable apparatus 10, there are provided: the connector 30 electrically connected with the in-vehicle apparatus 100; and an engagement portion 58 to be engaged with a lock mechanism (not shown) provided at the in-vehicle apparatus 100 side.

Figure 9:
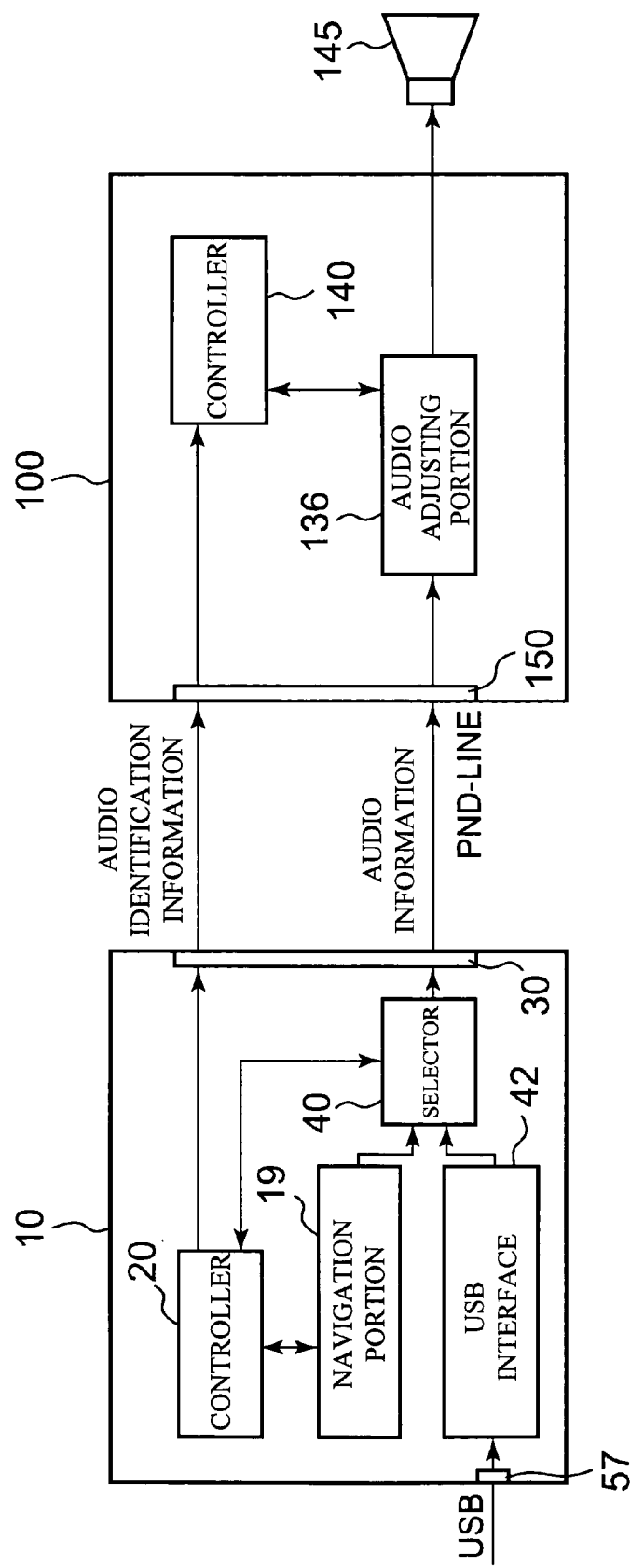
FIG. 9 is a view showing a navigation portion of the portable apparatus and an audio adjusting portion of the in-vehicle apparatus.

FIG. 9 shows the connections between the navigation portion 19 of the portable apparatus 10 and the audio adjusting portion 136 of the in-vehicle apparatus 100 in more detail than shown in FIG. 5. Referring to FIG. 9, USB audio information such as music or the like is externally input through the USB slot 57 to the portable apparatus 10. The USB music information is converted into an audio outputable format by a USB interface 42. Meanwhile, the navigation portion 19 outputs navigation audio information. A selector 40 selects either the navigation audio information or the USB audio information, according to the control of the controller 20, and sends from the connector 30 to the in-vehicle apparatus 100.

The controller 20 outputs audio identification information for identifying whether the audio information sent to the in-vehicle apparatus 100 is the navigation audio information (first audio information) or the USB audio information (second audio information), from the connector 30 to the in-vehicle apparatus 100.

In the in-vehicle apparatus 100, the audio information is received from the connector 150 by way of a single connecting line PND-LINE (receiver). The connecting line PND-LINE is input into the audio adjusting portion 136 (audio selector). The audio adjusting portion 136 outputs the audio information to the speaker 145 (audio outputting portion) according to an instruction of the controller 140.

Figure 10:
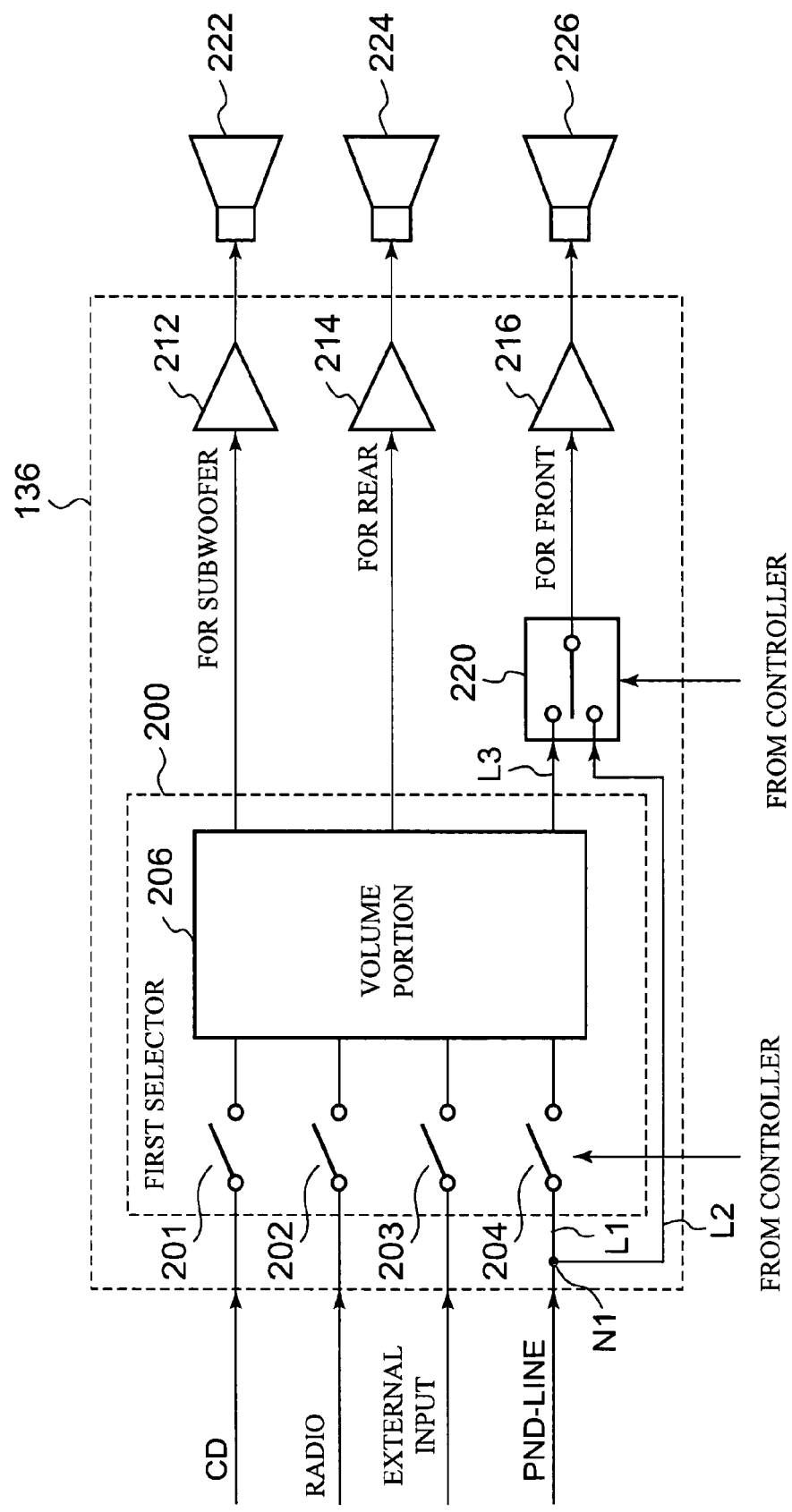
FIG. 10 is a detailed block diagram of the audio adjusting portion.

FIG. 10 is a block diagram of the audio adjusting portion 136. The connecting line PND-LINE transmitting the audio information input from the portable apparatus 10 branches at a node N1 provided inside or outside of the audio adjusting portion 136 into a first connecting line L1 (first line) and a second connecting line L2 (second line). The first connecting line L1 is input into a switch 204 of a first selector 200. The second connecting line L2 is input into a second selector 220.

The audio adjusting portion 136 includes: the first selector 200; the second selector 220; and amplifiers 212 through 216. The first selector 200 includes: a switch 201 connecting the audio information input from the CD player 135 (see FIG. 5) to a volume portion 206; a switch 202 connecting the audio information input from the radio receiver 134 (see FIG. 5) to the volume portion 206; a switch 203 connecting the audio information externally input from a portable music player or the like to the volume portion 206; the switch 204 connecting the audio information input by way of the first connecting line L1 from the portable apparatus 10 to the volume portion 206; and the volume portion 206. One piece of the audio information input into the audio adjusting portion 136 is selected by the switches 201 through 204 and fed to the volume portion 206. The volume portion 206 variably controls the volume level of the audio information, and branches the audio information to output to subwoofers (including left and right ones), rear seats (including left and right ones), and front seats (including left and right ones).

The audio information for the subwoofers is amplified by the amplifier 212 and output to a speaker 222. The audio information for rear seats is amplified by the amplifier 214 and be output to a speaker 224. The audio information for front is input through a third line L3 to the second selector 220. In addition, the second connecting line L2 is input into the second selector 220 without through the first selector 200. The second selector 220 connects either the second connecting line L2 or the third connecting line L3 to the amplifier 216 on the basis of an audio identification signal fed from the controller 140. Thus, the audio information for front is amplified by the amplifier 216 to be output to the speaker 226.

Figure 11:
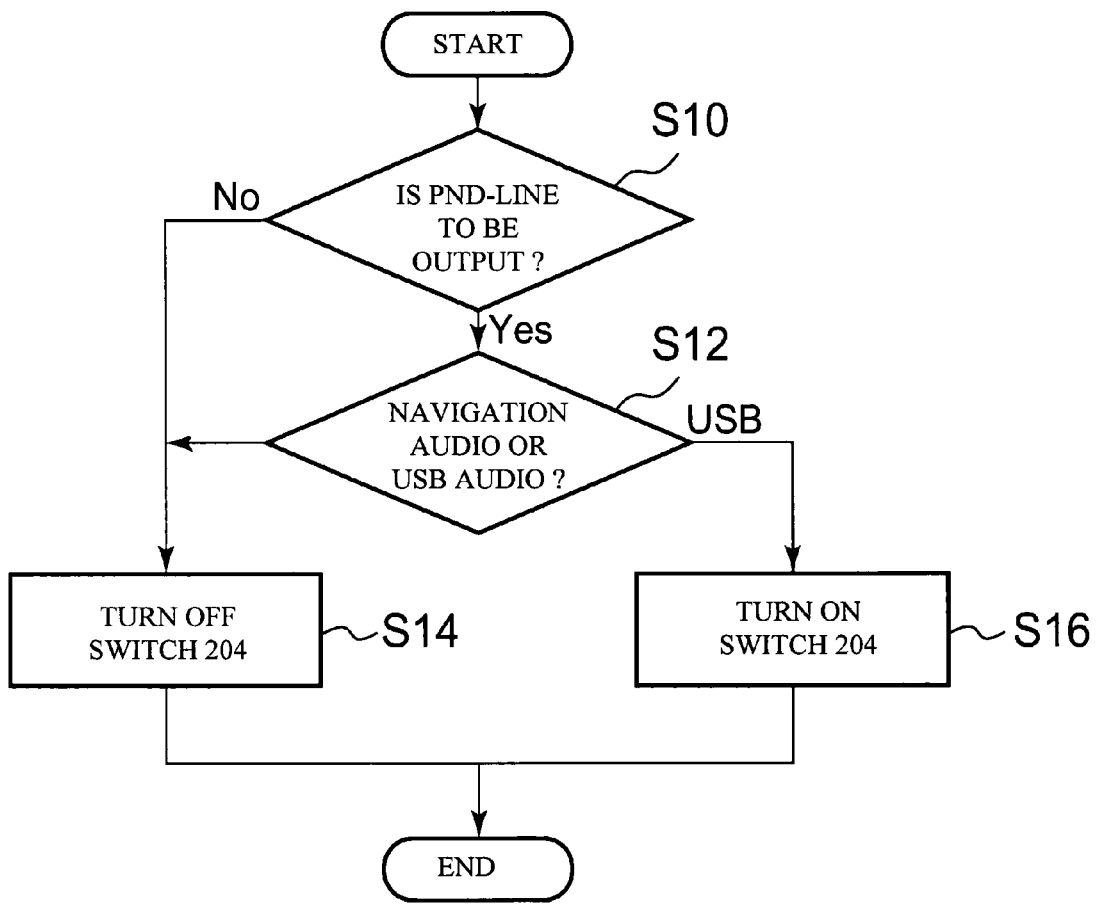
FIG. 11 is a flowchart showing operations of a first selector.

FIG. 11 is a flowchart showing control operations of the controller 140 to the first selector 200. The controller 140 determines whether the audio information of the connecting line PND-LINE is output to the speaker 145 (step S10). For example, the output of the USB audio through the portable apparatus 10 is selected. Alternatively, if the audio identification information represents the output of the navigation audio, the controller 140 determines that the audio information of the connecting line PND-LINE is to be output. If it is No at step S10, the first selector 200 turns off the switch 204 (step S14). If it is Yes at step S10, the controller 140 determines whether the audio information of the connecting line PND-LINE is the navigation audio information or the USB audio information, based on the audio identification information (step S12). If it is the navigation audio, the first selector 200 turns off the switch 204 (step S14). Therefore, the audio information is not input into the volume portion 206. If it is the USB audio information at step S12, the controller 140 turns on the switch 204 of the first selector 200 (step S16). Accordingly, the audio information is input into the volume portion 206.

Figure 12:
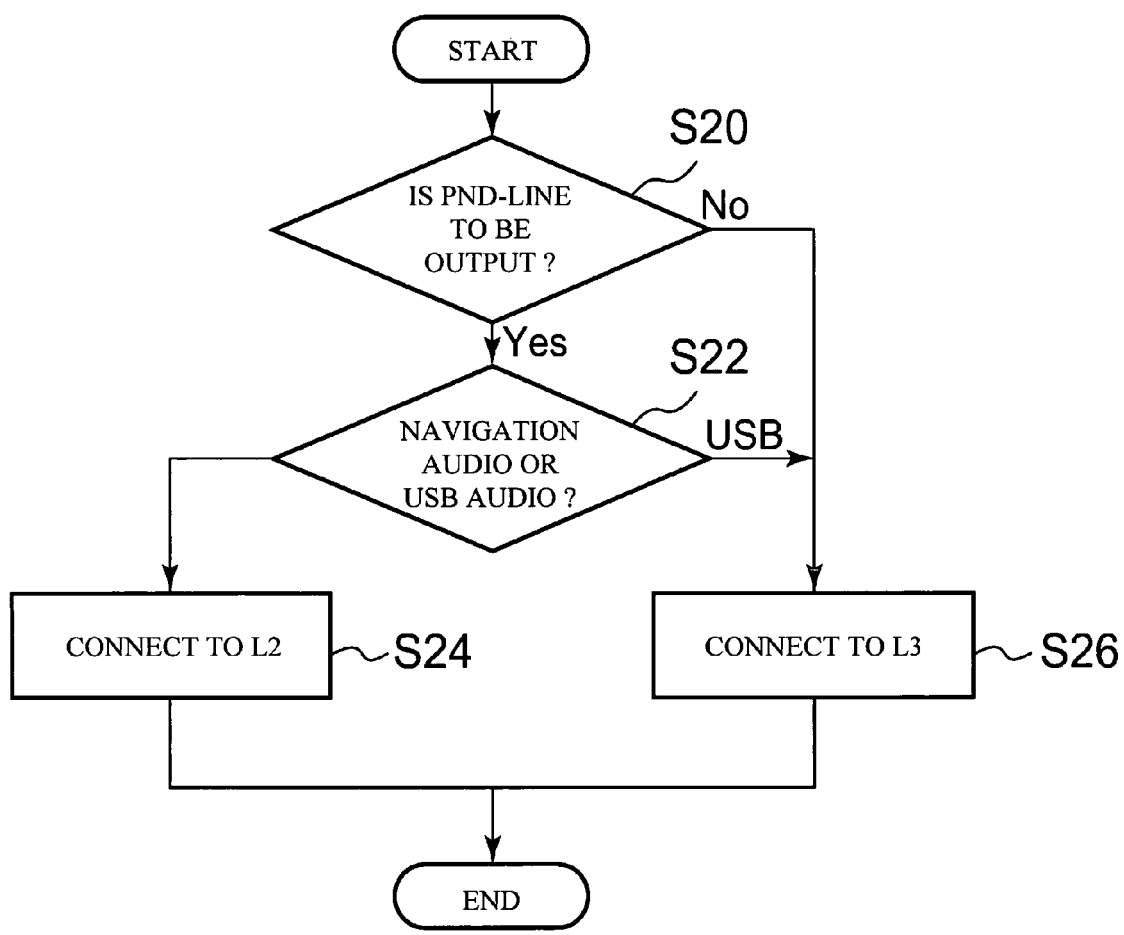
FIG. 12 is a flowchart showing operations of a second selector.

FIG. 12 is a flowchart showing the control operations of the controller 140 to the second selector 220. The controller 140 determines whether the audio information of the connecting line PND-LINE is output to the speaker 145 (step S20). For example, the output of the USB audio through the portable apparatus 10 is selected. Alternatively, if the audio identification information represents the output of the navigation audio, the controller 140 determines that the audio information of the connecting line PND-LINE is to be output. If it is No at step S20, the second selector 220 connects the third connecting line L3 for outputting the audio information for front at the first selector 200, to the amplifier 216 (step S26). If it is Yes at step S20, the controller 140 determines whether the audio information of the connecting line PND-LINE is the navigation audio information or the USB audio information, based on the audio identification information (step S22). If it is the navigation audio, the second selector 220 connects the second connecting line L2 to the amplifier 216 according to an instruction of the controller 140 (step S24). If it is the USB audio information at step S22, the second selector 220 connects the third connecting line L3 to the amplifier 216 (step S26).

In accordance with a first exemplary embodiment, as shown in FIG. 9, the in-vehicle apparatus 100 (in-vehicle electronic apparatus) is provided with the connecting line PND-LINE for receiving the navigation audio information (first audio information) output from the portable apparatus 10 (portable navigation apparatus) and the USB audio information (second audio information) through the portable apparatus 10, as the audio information. Referring to FIG. 11 and FIG. 12, when the audio information is the navigation audio information, the audio adjusting portion 136 (audio selector) turns off the switch 204 of the first selector 200 to connect the second connecting line L2 to the amplifier 216 for front (step S24). Thus, the audio adjusting portion 136 outputs the audio information to the speaker 226 (audio outputting portion), which is at least one of the speakers 222 through 226. Meanwhile, when the audio information is the USB information, the audio adjusting portion 136 turns on the switch 204 (step S16) and the second selector 220 connects the third connecting line L3 to the amplifier 216 for front (step S26). Hence, the audio adjusting portion 136 outputs the audio information to multiple speakers 222 through 226.

Focusing on the first selector 200 and the second selector 220, the first selector 200 is connected to the first connecting line L1 (first line). If the audio information is the navigation audio information (first audio information), the audio information input into the first connecting line L1 is not output. If the audio information is the USB audio information (second audio information), the audio information input from the first connecting line L1 is output to all the speakers 222 through 226 (audio outputting portions). Also, the second selector 220 is connected to the second connecting line L2. If the audio information is the navigation audio information, the audio information input from the second connecting line L2 is output to at least one speaker 226 out of the speakers. If the audio information is the USB audio information, the audio information output from the first selector 200 is output to multiple speakers 222 through 226.

In accordance with the first exemplary embodiment, the navigation audio information and the USB audio information are received by a single connecting line PND-LINE, thereby necessitating only one connecting line and one connector and enabling the size and cost to be reduced. It is enough if the navigation audio can be heard by some of passengers. In accordance with the first exemplary embodiment, it is possible to output the navigation audio from one speaker 226 out of the speakers, and output other audio information from all the speakers 222 through 226.

The driver is a passenger who mainly listens to the navigation guidance. Accordingly, one speaker to output the navigation audio is preferably the speaker 226 that outputs the audio to the driver. In the first exemplary embodiment, the navigation audio is output from the speaker 226 for left and right front seats; however, only the speaker at the driver's side, out of the speakers for the front seats, may output the navigation guidance.

Since the volume level of the navigation audio is controlled by the portable apparatus 10, the level may be constant at the in-vehicle apparatus 100. On the other hand, the USB audio is preferably controlled by the in-vehicle apparatus 100. Therefore, referring to FIG. 10, FIG. 11, and FIG. 12, if the audio information is the navigation audio information at the audio adjusting portion 136, the audio information does not pass through the volume portion 206. Accordingly, the volume level is fixed. On the other hand, the audio information passes through the volume portion 206, if the audio information is the USB audio information. Therefore, the audio adjusting portion 136 is capable of variably controlling the volume level.

Even if the USB audio information is not the audio information input into the portable apparatus 10 through the USB slot 57, the USB audio information may be the audio information connected through another interface or the audio information input into the in-vehicle apparatus 100 and output to the portable apparatus 10 then converted by the interface of the portable apparatus 10. For example, as shown in FIG. 9, when the portable apparatus 10 has the USB slot 57 and the USB interface 42 and if the in-vehicle apparatus 100 further includes the USB slot 57 and the USB interface 42, this impedes the reduction in size and cost. Hence, by utilizing the USB interface 42 of the portable apparatus 10, it is possible to further reduce the size and cost.

As shown in FIG. 9, based on the audio identification information representing whether the audio information output from the portable apparatus 10 is either the navigation audio information or the USB audio information, the audio adjusting portion 136 selects whether the audio information is to be output to all the speakers 222 through 226 or output to the speaker 226, at least one of the speakers, as shown in FIG. 11 and FIG. 12. In addition, the audio adjusting portion 136 selects whether or not the volume level is to be variably controlled or to be set constant, on the basis of the audio identification information. In this manner, the audio adjusting portion 136 is capable of making the above-described selection with ease by use of the audio identification information.

Since the audio identification information has a frequency that is not high, the connecting line transferring the audio identification information from the portable apparatus 10 to the in-vehicle apparatus 100 and the connector enable the reduction in size and cost more than those for audio information. As compared to two connecting lines and two connectors for audio information, the reduction in size and cost is possible. Furthermore, the audio identification information may be included in the audio information being transferred on the connecting line PND-LINE.

The portable apparatus 10 may be composed of a mobile phone with navigation capabilities, portable digital assistance (PDA), or the like. In addition, instead of the CD insertion/ejection slot 180 and the CD player 135, there may be provided an insertion/ejection slot and a player of a memory medium such as MD (Mini Disc), DVD (Digital Versatile Disc), memory card, or the like, and there may be provided multiple types of insertion/ejection slots and players.

Although a few specific exemplary embodiments employed in the present invention have been shown and described, it would be appreciated by those skilled in the art that changes may be made in these exemplary embodiments without departing from the principles and spirit of the invention, the scope of which is defined in the claims and their equivalents.

What is claimed is:

1. An in-vehicle electronic apparatus, to which a portable navigation apparatus is attachable, and which outputs audio information to multiple audio outputting portions, the in-vehicle electronic apparatus comprising:
    a receiver receiving as audio information, first audio information being navigation audio information output by the portable navigation apparatus and second audio information being inputted into the portable navigation apparatus, passing through the portable navigation apparatus and being outputted by the portable navigation apparatus;
    an audio selector outputting the first audio information to a part of the multiple audio outputting portions, in the case that the audio information is the first audio information, and outputting the second audio information to all of the multiple audio outputting portions, in the case that the audio information is the second audio information;
    a controller controlling the audio selector on the basis of audio identification information representing whether the audio information output from the portable navigation apparatus is the first audio information or the second audio information and being received from the portable navigation apparatus, in the case that the portable navigation apparatus is attached; and
    a single connecting line receiving the first audio information and the second audio information from the portable naviagation apparatus in the case that the portable navigation apparatus is attached.

2. The in-vehicle electronic apparatus as claimed in claim 1, wherein the part of the multiple audio outputting portions is an audio outputting portion outputting audio to a driver's seat.

3. The in-vehicle electronic apparatus as claimed in claim 1, wherein the audio selector keeps a volume level constant, in the case that the audio information is the first audio information, and the audio selector variably controls the volume level, in the case that the audio information is the second audio information.

4. The in-vehicle electronic apparatus as claimed in claim 1, wherein the second audio information is the audio information input into the portable navigation apparatus through a USB connector.

5. The in-vehicle electronic apparatus as claimed in claim 1, wherein the audio selector selects whether the audio information is to be output to said all of the multiple audio outputting portions or to the part of the multiple audio outputting portions, on the basis of the audio identification information.

6. The in-vehicle electronic apparatus as claimed in claim 1, wherein the audio selector selects whether a volume level is to be variably controlled or to be kept constant, on the basis of audio identification information representing whether the audio information output from the portable navigation apparatus is the first audio information or the second audio information.

7. The in-vehicle electronic apparatus as claimed in claim 1, further comprising:
    a first selector connected to a first line branched from a connecting line serving as the receiver, not outputting the audio information to be input from the first line in the case that the audio information is the first audio information, and outputting the audio information to be input from the first line to all the audio outputting portions in the case that the audio information is the second audio information; and
    a second selector connected to a second line branched from the connecting line, outputting the audio information to be input from the second line in the case that the audio information is the first audio information, and outputting the audio information to be output from the first selector to the part of the multiple audio outputting portions in the case that the audio information is the second audio information.

8. An in-vehicle electronic system provided with a portable navigation apparatus and an in-vehicle electronic apparatus, to which the portable navigation apparatus is attachable, and which outputs audio information to multiple audio outputting portions, the in-vehicle electronic system comprising:

- a receiver provided in the in-vehicle electronic apparatus and receiving as audio information, first audio information being navigation audio information output by the portable navigation apparatus and second audio information being inputted into the portable navigation apparatus, passing through the portable navigation apparatus and being outputted by the portable navigation apparatus;
- an audio selector provided in the in-vehicle electronic apparatus and outputting the first audio information to a part of the multiple audio outputting portions, in the case that the audio information is the first audio information, and outputting the second audio information to all of the multiple audio outputting portions, in the case that the audio information is the second audio information;
- a controller controlling the audio selector on the basis of audio identification information representing whether the audio information output from the portable navigation apparatus is the first audio information or the second audio information and being received from the portable navigation apparatus, in the case that the portable navigation apparatus is attached; and
- a single connecting line receiving the first audio information and the second audio information from the portable navigation apparatus in the case that the portable navigation apparatus is attached.

* * * * *